United States Patent [19]
Marechal

[11] 3,910,632
[45] Oct. 7, 1975

[54] MULTI-PLACE SEATS
[75] Inventor: Robert René Marechal, Paris, France
[73] Assignee: SICMA - Societe Industrielle et Commerciale de Material Aeronautique, Paris, France
[22] Filed: Feb. 15, 1974
[21] Appl. No.: 443,024

[30] Foreign Application Priority Data
Apr. 17, 1973 France.............................. 73.14496

[52] U.S. Cl.......... 297/232; 244/118 P; 244/122 R; 297/113; 297/191; 297/355
[51] Int. Cl.².................. A47C 15/00; B64D 11/06
[58] Field of Search....... 244/122 R, 118 P; 296/64, 296/65 R; 297/191, 194, 378, 417, 232, 422, 450, 355, 113, 451, 117, 146, 163

[56] References Cited
UNITED STATES PATENTS

| | | |
|---|---|---|
| 2,098,426 | 11/1937 | McDonald...................... 297/191 X |
| 2,240,748 | 5/1941 | Bak.................................... 297/146 |
| 2,824,599 | 2/1958 | Quinlan............................ 297/146 |
| 2,826,241 | 3/1958 | Himka......................... 296/65 R X |
| 3,009,737 | 11/1961 | Burnett...................... 244/122 R X |
| 3,145,052 | 8/1964 | Morgan............................ 297/163 X |
| 3,224,808 | 12/1965 | Spielman............................ 297/378 |
| 3,439,889 | 4/1969 | Karlsen....................... 244/122 R |
| 3,544,163 | 12/1970 | Krein.................................. 297/417 |

Primary Examiner—Trygve M. Blix
Assistant Examiner—Barry L. Kelmachter
Attorney, Agent, or Firm—Eyre, Mann & Lucas

[57] ABSTRACT

A multi-place seat for use in aircraft comprises back-rests independently pivotal about a fixed lower axis and a movable upper axis. Intermediate arm-rests and a central front table are retractable into the back-rests, these arm-rests and the table also being pivotal about the fixed lower axis and a movable upper axis. The upper pivotal axes of the back-rests, the arm-rests and the table can be moved into alignment.

7 Claims, 12 Drawing Figures

MULTI-PLACE SEATS

BACKGROUND OF THE INVENTION

1. Field of the Invention

The present invention relates to multi-place seats, for example seats for use in passenger aircraft.

2. Description of the Prior Art

In an aircraft the space available particularly across the width of the cabin, is necessarily limited. Nevertheless, the aircraft companies install the maximum number of seats that can be sold in each row in order to ensure maximum profit and to comply with the demand for places at peak traffic periods. This is the case in aircraft which have in each row two three-place seats separated by a corridor. When all the seats are occupied, the comfort of the passengers is reduced to its strict minimum. But with a seat of this kind, when the middle place is not occupied the occupants of the outer places naturally have more room towards the middle of the seat.

Seats have been proposed with articulated arm-rests which can be lifted up between the back-rests. The back-rests are generally adapted to be moved pivotally, and these arm-rests generally have only two positions, that is to say a raised position and a lowered position. For this reason, although the arm-rests when raised make it possible to increase the width of the seat at the sitting level, they do not increase the width of the back-rest; on the contrary, when they are fixed in the raised position they may inconvenience the occupant of the seat who wishes to lean his back-rest backwards. If an attempt is made to pivot the arm-rests in such a manner that they can be rotated rearwardly together with the back-rests, difficulties of a geometric nature are encountered. Actually, if a back-rest is to be comfortable its pivotal axis must be located approximately at the intersection of the cushion of the seat part and that of the back-rest, whereas the pivotal axis of an arm-rest must be situated in the zone of the intersection of the back-rest and the arm-rest, that is to say about 10 cm higher than the axis of the back-rest. If it were possible to find an intermediate position which would make it possible to support the arm-rest and the back-rest by one and the same shaft, the problem of retraction of the arm-rest would be solved. It has been found, however, that such a compromise affects the comfort of the back-rest and increases the amount of space occupied at the rear when the arm-rest is raised.

An object of the present invention is to provide a seat free from the above disadvantages.

SUMMARY OF THE INVENTION

According to the invention there is provided a multi-place seat in which each liftable arm-rest is pivoted at its rear end to the top end of a rod of which the bottom end is mounted for pivotal movement on the fixed support about a transverse axis which coincides with the axis of pivotal movement of the back-rest, and the amplitude of pivotal movement of the said rod on the fixed support is limited forwardly by a front abutment rigid with the said fixed support, whereas the amplitude of pivotal movement of the arm-rest with respect to the rod in both directions is limited by abutments carried by these two members, and the amplitude of the pivotal movement of the unit formed by the rod and the lifted arm-rest is limited rearwardly by the said rod coming into contact with an abutment carried by the rear part of the back-rest.

When the arm-rest is used in a horizontal position, the rod bears against the front abutment, whereby the pivot axis of the arm-rest is fixed in space. The rotation of the arm-rest about this axis is also limited downwardly in the horizontal position by the arm being formed as an abutment bearing against that of the rod.

When it is desired to retract the arm-rest into the back-rest, the arm-rest is made to pivot upwards by a single movement. This rotation takes place about both axes of the rod simultaneously or successively according to the frictional forces associated with each pivot, but always ends in a position aligned with the back-rest irrespectively of the inclination of the back-rest. The rearward rotation of the arm-rest and of its support rod is actually limited by the back-rest itself, preferably by the structure of the back-rest.

According to a preferred form of the invention, the rearward rotation of the arm-rest about the upper axis of the rod is limited by their respective shapes. After rotation through this limited angle, the arm-rest and the support rod pivot rigidly with one another towards the rear about the lower axis until they come into contact with the structure of the back-rest.

A cavity for the arm-rest and the support rod is provided in the cushion of the back-rest. Preferably, to improve appearance and comfort the lower surface of the arm-rest will be provided with a cushion and a cover similar to those of the back-rest itself, so that when raised the arm-rest together with the back-rest presents a uniform upholstered surface. In this retracted position the arm-rest will easily follow all the pivotal movements which the passenger may cause the back-rest to make, because all of the movable members rotate about one and the same axis.

It is clear that by this system the position of the arm-rest when performing its two functions is optimum and that the disadvantages of a geometrical system based on a single axis or on two axes fixed in space are eliminated. The installation described above, comprising a double articulation for the support of the arm-rest and the particular construction of the arm-rest enabling the arm-rest to fit into the back-rest, may advantageously be completed by two similar systems permitting (1) the installation of a front table retractable into the central back-rest of a convertible three-place seat and (2) an arrangement whereby all of the back-rests can be pivoted completely forwards.

As regards the retractable front table, three-place convertible seats have been proposed in which the upper part of the back-rest is pivoted so that it can be moved forward between the arm-rests. This arrangement has the disadvantage that any occupant of the seat located immediately behind the pivoted back-rest is deprived of the accessories normally installed in the top of the back-rest of an aircraft seat (ash-tray, oxygen, luggage holders, pocket and the like). Moreover it may happen that if the tilted back-rest is used as a table for supporting glasses, it may receive stains and dirt which are unpleasant for the occupant situated immediately behind, when this part of the back-rest is subsequently raised again. Also, the stability of tables of this kind is not completely satisfactory, because in the forwardly pivoted position the back-rest cushion is supported on the seat cushion.

This position is also not clearly defined in space, because in principle the central back-rest is pivotal like the two adjacent ones and its position is not always the same when the lower part is pivoted forwards.

According to another preferred feature of the invention, these disadvantages are eliminated by a table which is accommodated within the thickness of the central back-rest and which like the central arm-rests is supported by two rods which are also pivotally mounted on the shafts of the central and lateral back-rests. This method of mounting makes it possible to use the central table exactly like the arm-rests, either in a forwardly pivoted position or in a position retracted into the central back-rest. Preferably, the two lateral edges of the table will be upholstered in the same way as the central arm-rests, and at the same level as these. In this way, when the occupants of the lateral seats wish to increase the width of their seat, they only have to retract the central arm-rests and pivot the central table forward and then they each have an arm-rest at the same level but situated at a greater distance from the fixed lateral arm-rest. In a typical seat, the gain in width that is obtained is about 7 cm for each of the lateral places. The table mounted in this way is upholstered like the arm-rests and the back-rests (on its lower surface) and this enables it to be used as a back-rest when it is retracted into the central back-rest. Its doubly pivoted support enables it to follow the back-rest in its pivoting movements, as the arm-rests do, without any disadvantages as regards the comfort of any occupant of the central seat. The simplicity inherent in this system enables all passengers, even those who are inexperienced, to use it without the assistance of the crew personnel. No incorrect operation is possible, irrespective of whether the seat is partly or wholly occupied.

As regards the complete forward pivoting of all the back-rests, this possibility is required at the present time for reasons of safety and maintenance of the cabins and to reduce their volume during storage and packing. When a pivotal back-rest is swung forwards, the same shaft is generally used as the one employed for rearward pivoting. The back-rest pivoted in this way must be capable of passing between the arm-rests.

The first disadvantage of this arrangement is that the width of the back-rests is limited to the distance available between the arm-rests. A second disadvantage is the amount of space which the back-rests occupies in front; it actually extends far beyond the front end of the arm-rests and creates an obstacle between the seats. The gain in storage volume is not optimum; the seat is less high but it is longer.

According to a further preferred feature of the invention these disadvantages are avoided by pivoting the back-rest about two shafts instead of only one, and by using the upper shaft for pivoting the back-rest forwardly.

Preferably, all the back-rests of a convertible seat in accordance with the invention will be provided with a second pivot. This second pivot of the back-rest will be independent of the upper pivot of the arm-rest, but its position in space will be such that when the back-rest is in its most upright position, the two axes coincide geometrically.

When the back-rest is pivoted rearwards, its upper pivot does not operate, and the upper part is supported on the lower part of the structure.

On the other hand, when a foward thrust is exerted on the top of the back-rest, it is made to pivot about its upper pivot until it abuts against the corresponding central arm-rest.

This operation can also be carried out when the central arm-rest has first been retracted into the back-rest. Both parts pivot together about the same geometrical axis.

In the case of a doubly pivoted back-rest in accordance with the invention, and when the seat has to be provided with a rear table pivoted on the pivotal axis of the back-rest, in a manner known per se, in accordance with a further preferred feature of the invention a second pivot is added to the arm of the table. When the table is not used and is folded back against the back-rest, the upper pivot of its arms is located on the axis of the upper pivot of the back-rest. When the table is pivoted rearwardly in order to be used, it pivots on its lower pivot, on an axis located at the level of the lower axis of the back-rest. In this position, of use, the upper pivot does not operate, and the upper part of the arm bears against the lower part. On the other hand, when the back-rest is pivoted forwardly the table folded back against the arm-rest can follow it in its tilting movement about its upper axis which coincides with the upper pivotal axis of the back-rest.

BRIEF DESCRIPTION OF THE DRAWINGS

Embodiments of the invention will now be described, by way of example only, with reference to the accompanying diagrammatic drawings, in which.

In all the Figures, the same reference numerals designate identical elements.

DESCRIPTION OF THE PREFERRED EMBODIMENTS

Figure 1:
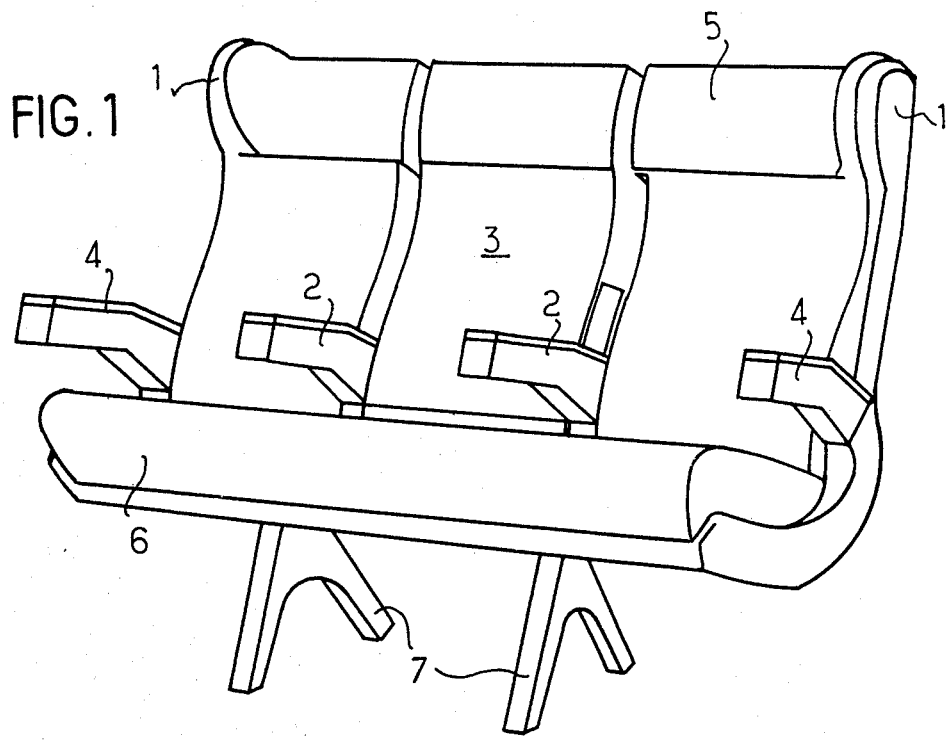
FIG. 1 is a front perspective view of a convertible three-place seat in accordance with the invention, the seat being shown in a configuration to permit occupation of each of the three places.

There is shown in FIGS. 1 to 6 a three-place convertible seat comprising a fixed support frame 7, a single seat cushion 6 for the three places which has a single length which may be suitable both for two and for three occupants, two fixed outer arm-rests 4, two intermediate retractable arm-rests 2, a pivotal central front table 3, a pivotal central back-rest 5, two pivotal outer back-rests 1, and three pivotal rear tables 21.

Figure 2:
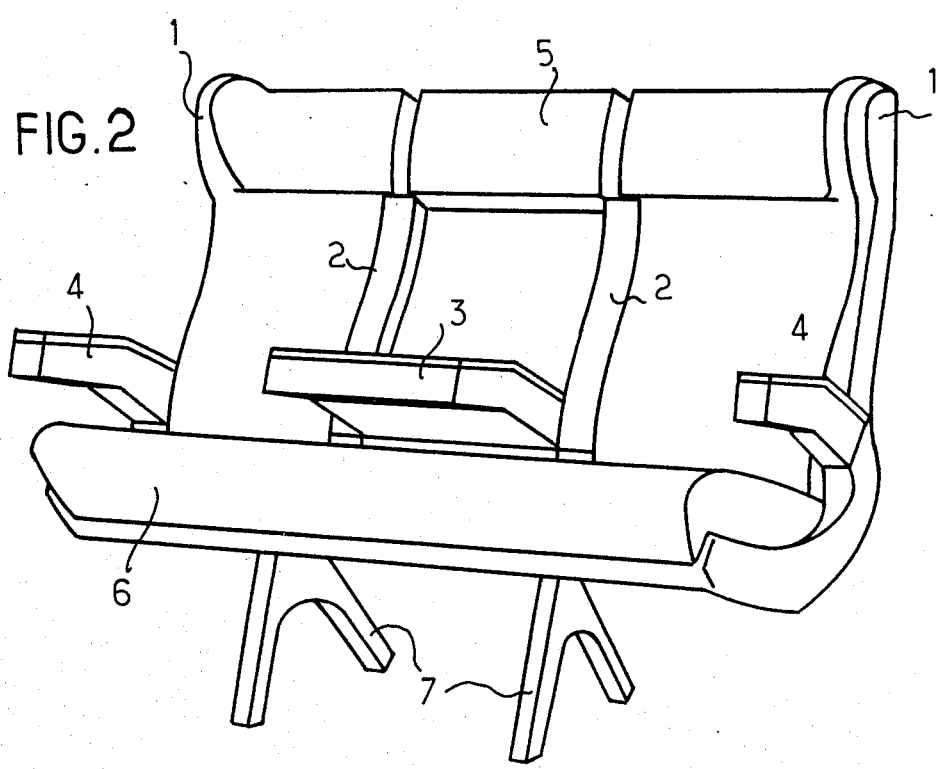
FIG. 2 is a view similar to FIG. 1 but showing the seat in a configuration to permit occupation of only two places.

FIGS. 1 and 2 clearly show how the conversion from three places to two places is effected; assuming that the central seat 5 is unoccupied, one or the other of the passengers occupying the outer places may decide to raise his intermediate arm-rest 2 and retract it into his back-rest. He may then decide to pivot the front central table 3 which provides him with an arm-rest surface at the same level as his outer arm-rest 4. The final result is a seat which is substantially widened at the level of the arm-rest but of which the back-rest 1 has a useful surface which is also widened by reason of the fact that the retraction of the intermediate arm-rest 2 exactly fills up the gap provided in the back-rest 1. It is to be noted that the pivoting of the front table 3 is independent of the position of the intermediate arm-rests 2. An occupant of an outer place may therefore decide to keep his intermediate arm-rest 2, even if the other occupant decides to raise his and to use the front table 3. It is equally possible to retract the intermediate arm-rests 2 and the front table 3 simultaneously; this makes it possible to use the seat as a single bench and enables a single occupant to lie down on the seat cushion 6 is he so desires.

Figure 3:
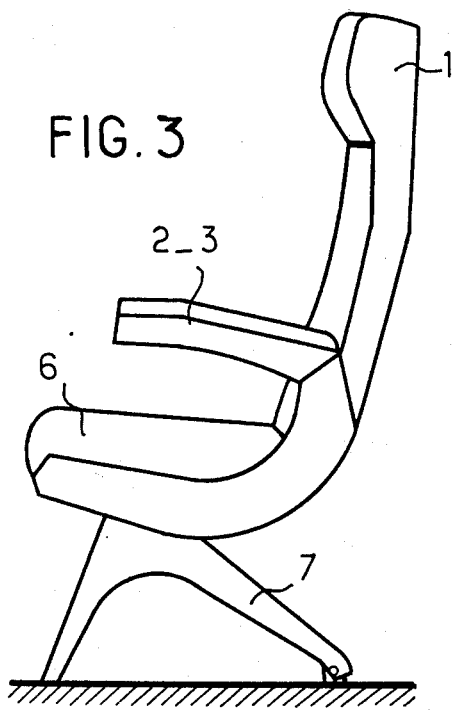
FIG. 3 is a side elevation of the seat, the back-rests being shown in their most upright position, and the central arm-rests and a front table being shown in their forwards position.
Figure 4:
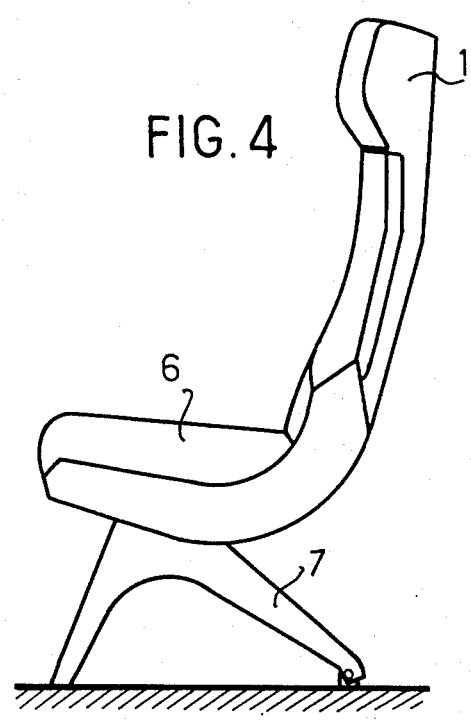
FIG. 4 is an elevation similar to FIG. 3, but showing the central arm-rests and the front table retracted into the back-rest.
Figure 5:
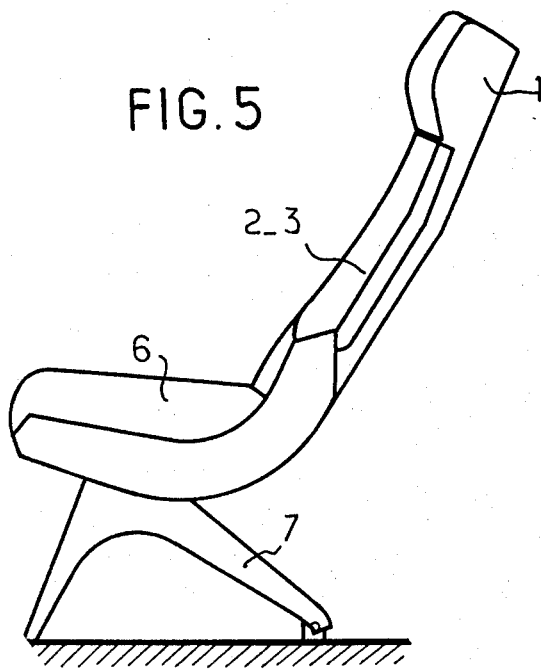
FIG. 5 is an elevation similar to FIG. 4, but showing the back-rests inclined at 34° towards the rear with the central arm-rests retracted.
Figure 6:
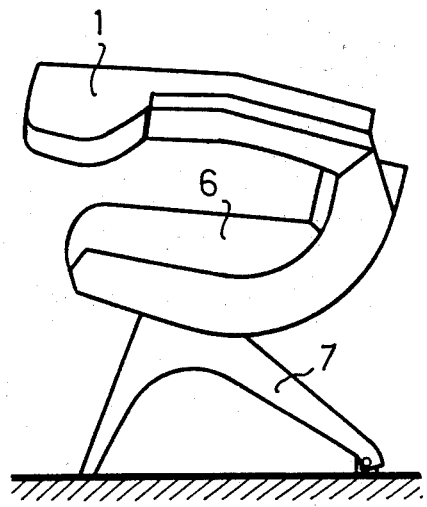
FIG. 6 is an elevation similar to FIG. 4 but showing all the back-rests pivoted horizontally forwardly.

FIGS. 3 to 5 show how the intermediate arm-rests 2 and the front table 3 when retracted into the back-rests occupy a fixed position with respect to the back-rests irrespective of the inclination of the back-rests. On the other hand, the arm-rests 2 and the table 3 when in their horizontal forward position as shown in FIG. 3 retain this fixed position relatively to the fixed support frame 7 irrespective of the inclination of the back-rests. FIG. 6 shows that when the back-rests are pivoted forwards neither the arm-rests 2 nor the front table 3 obstruct the back-rests but on the contrary are accommodated in the back-rests in the same way as in the case of FIGS. 4 and 5.

Figure 9:
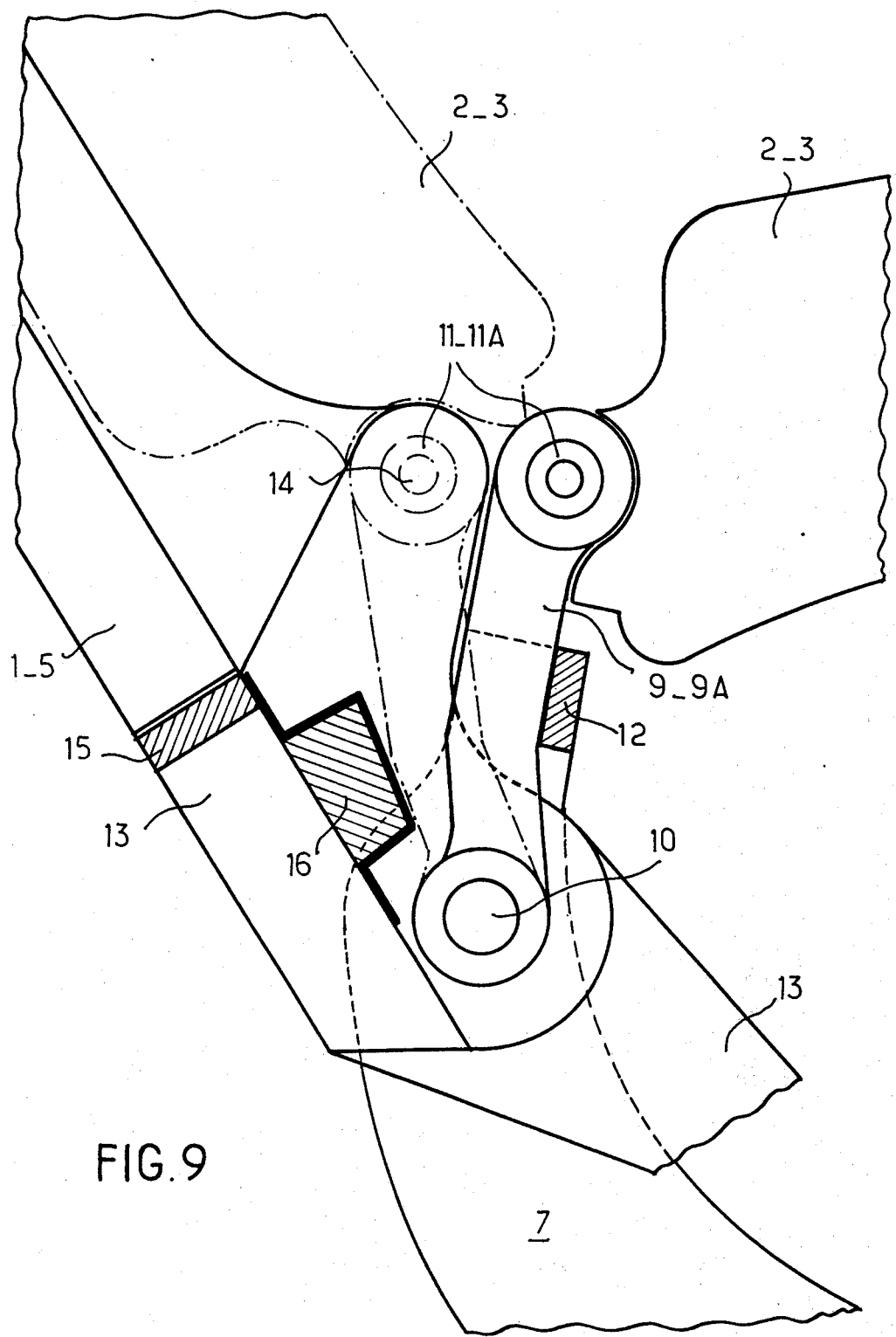
FIG. 9 is a longitudinal section of the pivoting system of an arm-rest and a front table.
Figure 12:
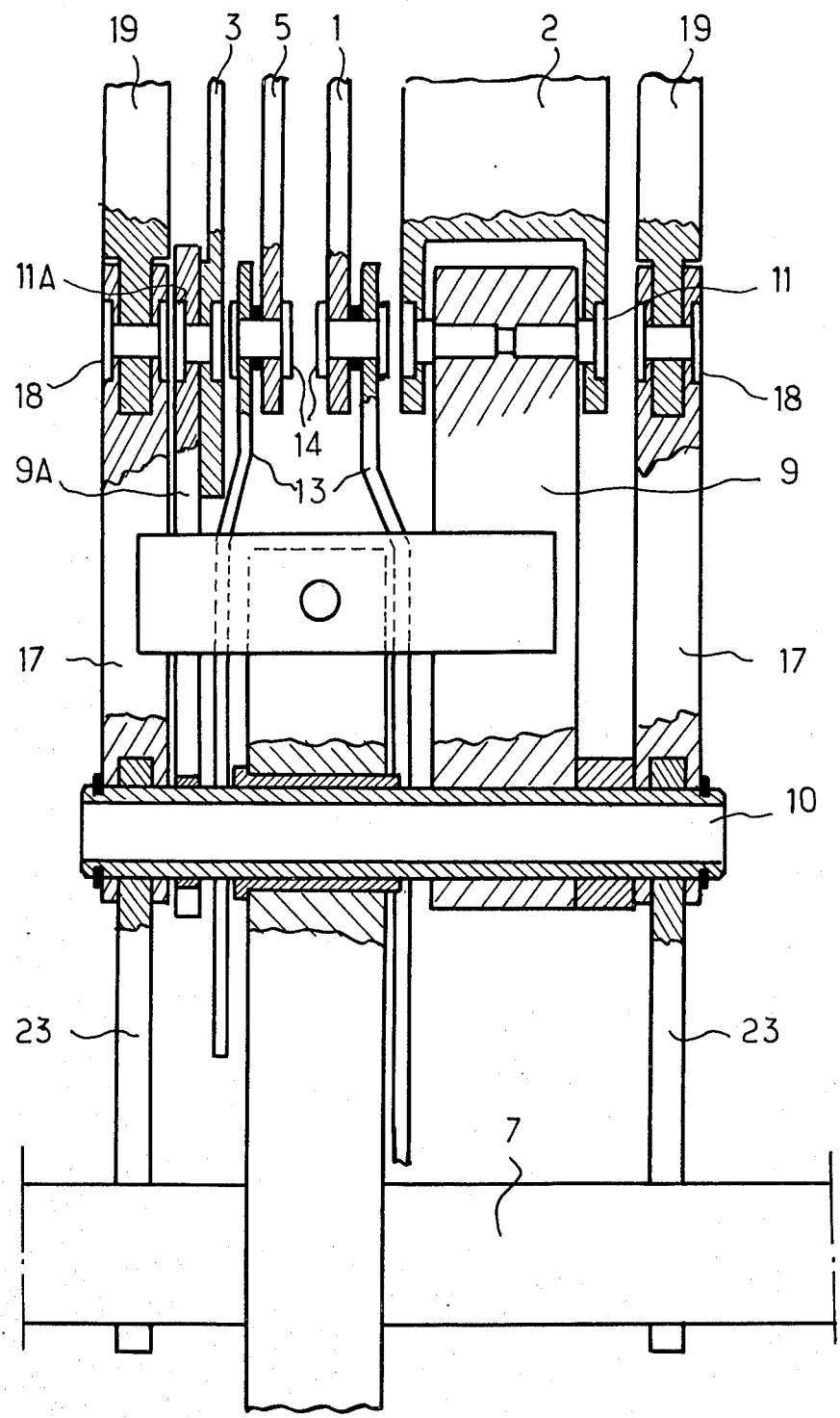
FIG. 12 is a transverse section showing the grouping of the three pivoting systems of FIGS. 9, 10, and 11.

FIGS. 9 and 12 show the mechanism for permitting pivotal movement of the intermediate arm-rests 2 and the front central table 3 with respect to the back-rests 1 and 5. A transverse shaft 10 fixed to the support frame 7 of the seat by arms 23 supports all the essential pivoted elements. Rearward pivoting of the back-rests about the shaft 10 is controlled by the occupants of the seat by any suitable mechanism (not shown). Each intermediate arm-rest 2 is pivotally connected by means of shafts 11 to the top end of a rod 9 of which the bottom end pivots on the shaft 10. The pivoting movement of the rod 9 about the shaft 10 is limited forwardly by an abutment 12 fixed to the support frame 7 and rearwardly by an abutment 16 carried by the structure of the back-rests 1 or 5; it is thus limited by the actual position of the back-rest selected by the occupant. When the rod 9 bears against the abutment 16, the corresponding shaft 11 is in a fixed position with respect to the back-rest in which the axis of the shaft 11 is aligned with a pivot shaft 14 of the back-rest, as will be described hereinafter.

The front central table 3 is pivotally connected to the top end of a rod 9A by means of a shaft 11A, the bottom end of the rod 9A being pivotal about the shaft 10.

The shape of the pivotally interconnected elements can be seen from the drawings and the shape is such that it limits their relative rotation to an angle of about 100°.

In their horizontal position, the intermediate arm-rest 2 and the front central table 3 bear against the rods 9 and 9A respectively, which bear against the abutment 12. When the occupant of an outer place wishes to retract his intermediate arm-rest 2 or the front central table 3, he simply pivots it upwardly about the shaft 11 or shaft 11A. When the element 2 or 3 raised in this way abuts against the rod 9 or 9A, the rotation about the shaft 11 or 11A is stopped but the unit consisting of the element 2 or 3 and its support rod 9 or 9A continues to rotate about the shaft 10 until this unit is completely retracted into the back-rest, bearing simultaneously against the abutment 16 of the back-rest.

Figure 10:
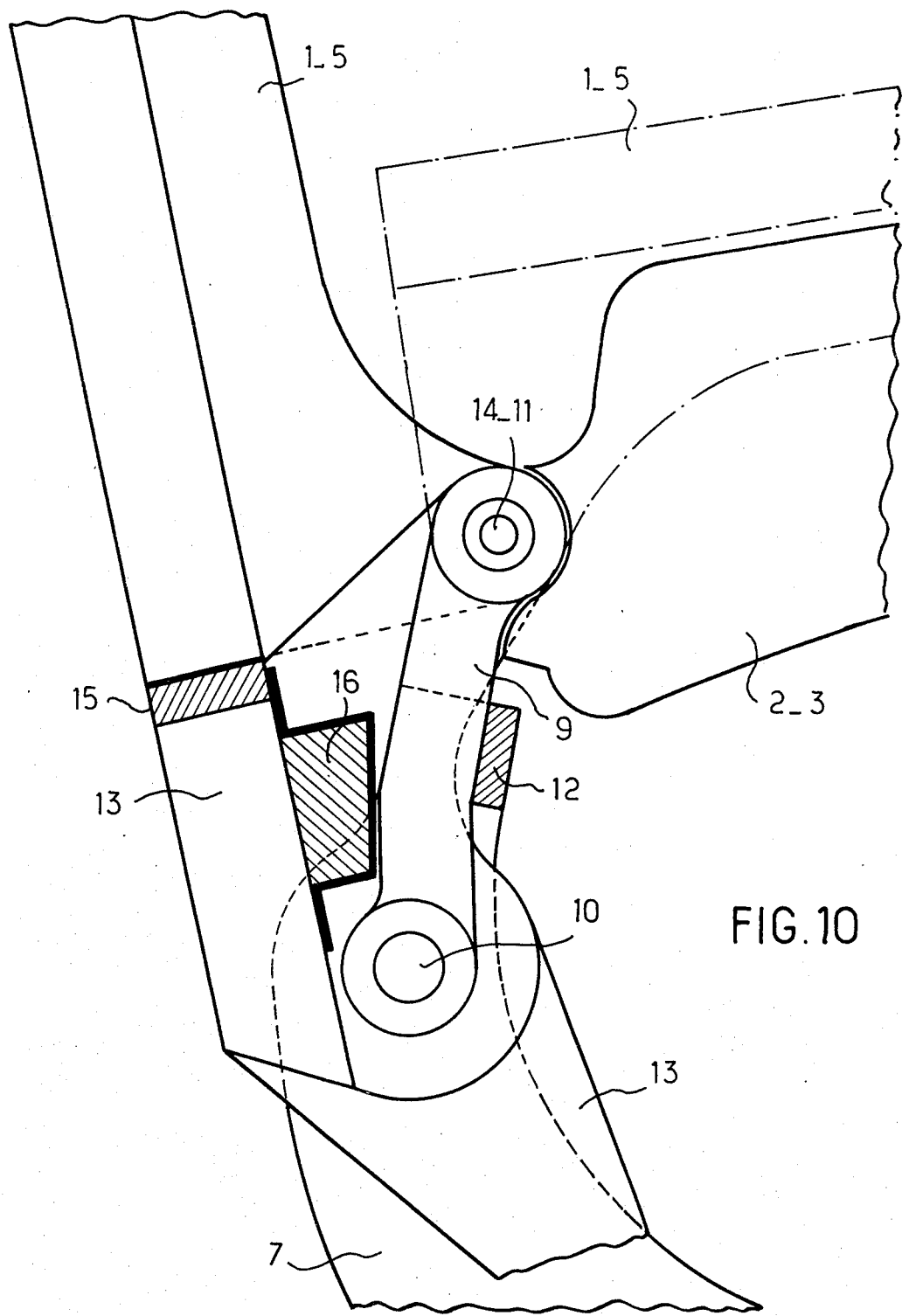
FIG. 10 is a longitudinal section of the pivoting system of a back-rest and a front table.

FIGS. 9, 10 and 12 show the doubly pivoted system of the back-rest. Supports 13 which constitute the bottom part of the frame of the back-rest pivot on the shaft 10. The inclination of the back-rest is controlled by the occupant of the seat by means not shown in the drawings, but which will be known to those skilled in the art.

In its upper part, the support 13 carries a pivot shaft 14 on which the upper parts of the back-rests 1 or 5 can pivot. This pivotal movement is limited rearwardly by the form of the structure of the back-rests which bear against abutments 15 fixed to the supports 13. The distance between the pivot shafts 10 and 14 of the supports 13 is equal to the length of the rods 9, 9A. The supports 13 also carry the abutment 16 which limits the rearward inclination of the rods 9, 9A in the exact position which places their associated shafts 11, 11A in alignment with the shaft 14 of the support 13. When the intermediate arm-rests 2 or the front table 3 are retracted into the corresponding back-rests, all the pivoted elements are fixed relatively to one another and pivot together about the shaft 10 under the control of the occupant. On the contrary, when the arm-rests 2 or the table 3 are in the horizontal position in which they are used, the rods 9, 9A bear against the abutment 12 and the movements of the back-rest do not affect this position.

FIG. 10 shows the back-rests 1, 5 in two positions, namely, an upright position in which the back-rests are inclined at 15° to the vertical and a position in which the back-rests have been pivoted forwardly and extend generally horizontally. To pass from one position to the other, it is only necessary to pivot the back-rest about its shaft 14; the support 13 of the back-rest remains fixed with respect to the support frame 7.

It will be noted that in their horizontal position, the back-rests cover the intermediate arm-rests 2 or the front table 3 in the same way as when these elements are retracted into the back-rest, by reason of the fact that in all these positions the axes of the shafts 14 and 11 coincide.

Figure 7:
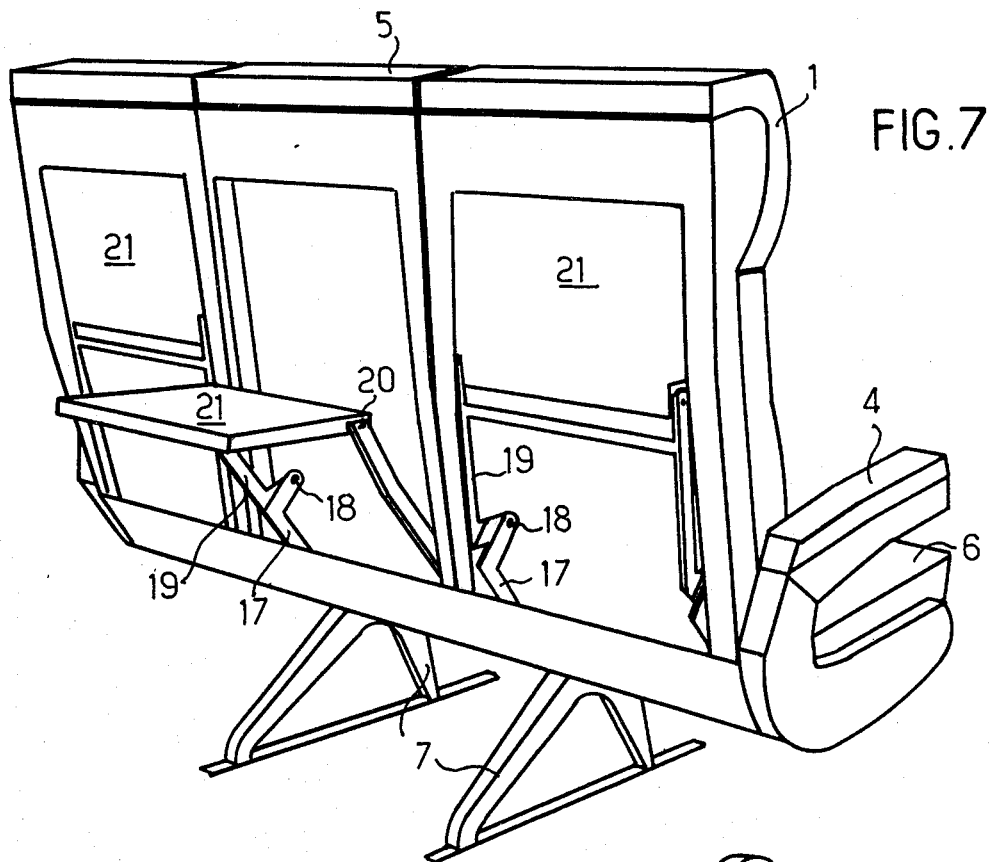
FIG. 7 is a rear perspective view of the seat of FIG. 1.
Figure 8:
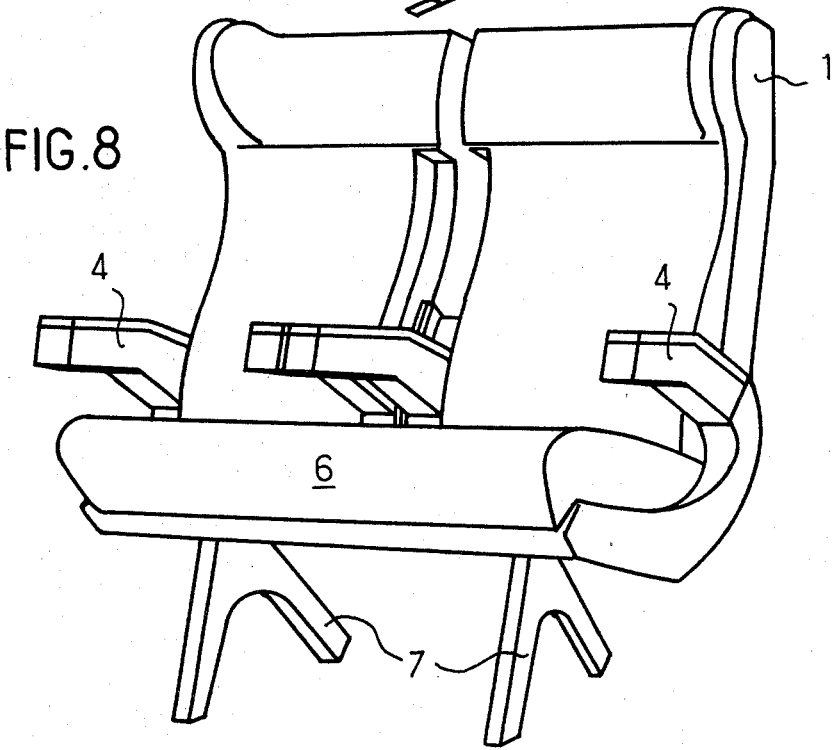
FIG. 8 is a front perspective view of a two-place seat in accordance with the invention, provided with two central arm-rests each having a system of pivots identical with that of the three-place seat of FIG. 1.
Figure 11:
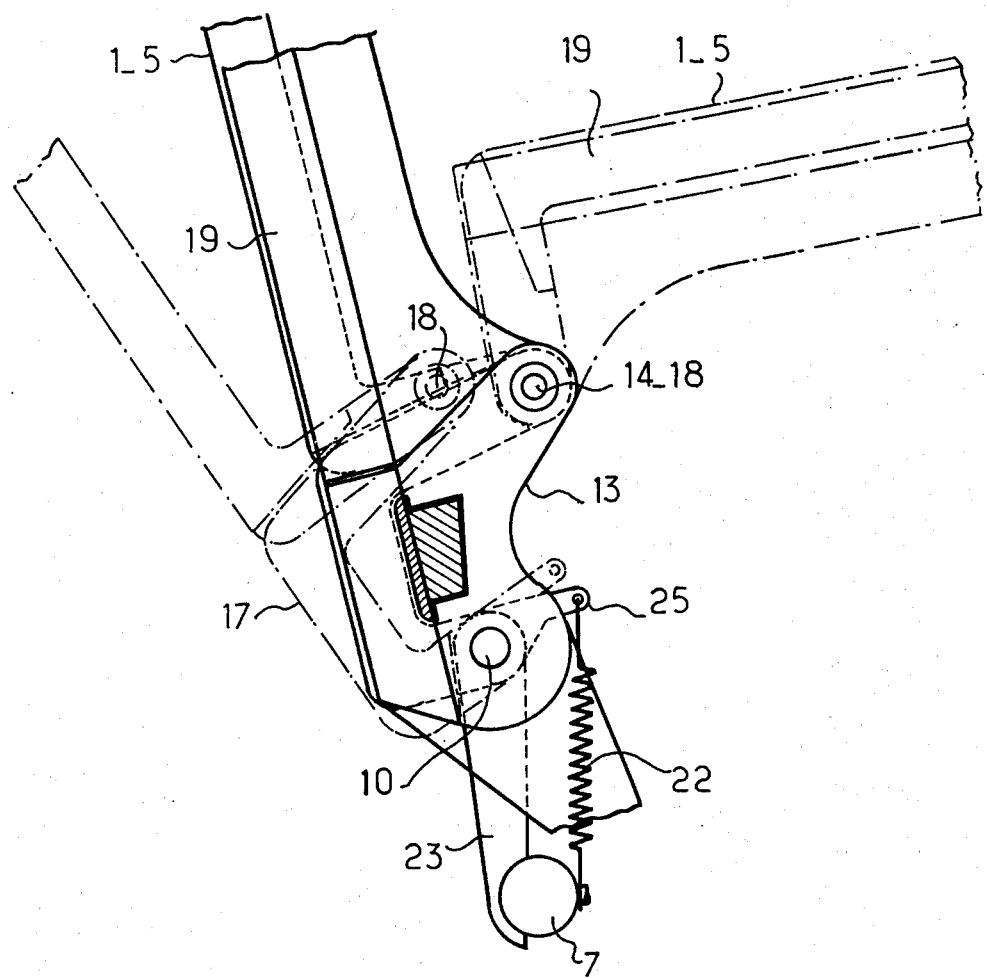
FIG. 11 is a longitudinal section of the pivoting system of a back-rest and a rear table.

FIGS. 11 and 12 show the whole of the doubly pivoted support system of the rear tables 21 (see also FIG. 7). A substantially C-shaped lower support 17 is pivotal on the shaft 10. It its upper part this support carries a pivot shaft 18 on which an L-shaped arm 19 can pivot;

in its upper part this arm carries a pivot shaft 20 on which one side of a rear table 21 can pivot within certain angular limits. Each table is thus supported by two arms 19 and these arms are pivotally connected to two C-shaped pivoted supports 17.

It has been proposed to mount an arm of a table for pivotal movement about the pivotal axis of an arm-rest, so as to keep the table rigid with the back-rest when the table is not in use and to make the table independent when the table is tilted rearwardly into a horizontal position. However, such a system could not be used in conjunction with a doubly pivoted back-rest in accordance with the invention. Actually, when tilted forwards this back-rest pivots about the upper shaft 14 of its pivoted support 13. To enable the table to maintain the same fixed position in the back-rest when the back-rest is tilted forwards, the table must be capable of pivoting about a shaft 18 (FIGS. 11 and 12) the axis of which is coincident with the shaft 14. It is therefore necessary that the arm of the table, like the other elements of the seat, must consist of a system of two parts 17 and 19 pivotally connected to one another.

The C-shape of the lower support 17 enables it to be pivoted on the shaft 10 and to carry the shaft 18 in alignment with the shaft 14, without interference with the structure of the back-rest, with due regard to the fact that the table 21 must be capable of being disengaged rearwardly from the back-rest. In front of the shaft 10, the support 17 has an extension in the form of a finger 25 which is at all times urged downwardly by a tension spring 22 connected to the fixed support frame 7. The strength of this spring and the direction of the finger 25 are such that the spring is not sufficiently strong to counterbalance the weight of the table 21 when extended rearwardly in the horizontal position as shown at the centre of FIG. 7. On the other hand, as soon as the user wishes to retract this table 21 into the backrest, he raises the table and the spring 22 is then capable of returning the support 17 into the position in which it abuts against the lower structure 13 of the back-rest, so that the axis of the shaft 18 coincides with that of the shaft 14. The supports 17, the arms 19 and the table 21 are then retracted into the back-rest. When the back-rest is tilted forwardly, the table 21 and the arms 19 will naturally follow the movement about the two shafts 18 and 14 of which the axes coincide.

The pivoting support 17 and the arm 19 are so shaped that they abut against one another when the table 21 is extended rearwardly.

The arms 23 rigid with the support frame 7 of the seat form an abutment limiting the rearward pivoting movement of the support 17.

In FIG. 12, the axes of the shafts 11, 11A, 14 and 18 are shown in a position in which they coincide. The distance between these axes and the axis 10 is necessarily the same for all the supports 9, 9A, 13 and 17. The shafts 11, 11A, 14, and 18 are independent of one another in such a manner as to permit each of the supports 9, 9A, 13 and 17 to assume an independent angular position about the shaft 10, within the limits fixed by the abutments. The arrangement of these elements relative to one another enables the back-rests 5 and 1 to envelop the front table 3 and the arm-rests 2 respectively.

What is claimed is:
1. In a multi-place seat,
   fixed support means,
   transverse shaft means carried by the support means said transverse shaft means having a pivotal axis,
   a plurality of adjacent back-rests pivotal individually about said shaft means,
   a plurality of arm-rests including at least one intermediate each adjacent pair of back-rests,
   means mounting at least the intermediate arm-rests for pivotal movement, whereby said arm-rests can be raised, said mounting means comprising,
   upwardly extending rod means associated with each said intermediate arm-rest, the lower end of said rod means being pivotal about an axis coincident with the pivotal axis of the back-rests, and the upper end of said rod means being pivotally connected to the arm-rest,
   first abutment means rigid with the said fixed support means for limiting forward pivotal movement of the rod means,
   second abutment means rigid with the arm-rest and the rod means for limiting pivotal movement of the arm-rest relative to the rod means, and
   third abutment means rigid with the back-rest for limiting rearward unitary movement of the rod means and the arm-rest when the arm-rest is in a raised position.

2. A seat according to claim 1, comprising at least three said back-rests, said seat further comprising
   front table means, an intermediate one of said back rests having a cavity across its entire width to receive the front table means, the height of said cavity, being equal to the length of said pivotal arm-rests,
   means mounting said front table means for pivotal movement, said mounting means comprising,
   upwardly extending second rod means, said second rod means being equal in length to said rod means, the lower end of said second rod means being pivotal about an axis coincident with the pivotal axis of the back-rests, and the upper end of said second rod means being pivotally connected to said front table means, pivotal movement of said front table means with respect to said second rod means being limited by abutment means.

3. A seat according to claim 2 further comprising,
   pivotal support means linking the back-rests to the shaft means, said pivotal support means being equal in length to the first mentioned and second rod means,
   fourth abutments rigid with the fixed support means for limiting forward pivotal movement of said pivotal support means, and
   fifth abutment means on said pivotal support means for limiting rearward pivotal movement of the back-rests.

4. A seat according to claim 1, further comprising
   rear table means mounted on the rear surface of each of said back-rests, said rear table means having a bottom edge, and
   means mounting each of said rear table means for movement between extended and retracted positions, said rear table mounting means comprising,
   upwardly extending arms of substantially L-shape
   upwardly extending levers of substantially C-shape, the lower ends of the levers being pivotal about an axis coincident with the pivotal axis of the back-rests, the upper ends of the levers being connected to the lower ends of a respective said arm-rest, the distance between the two said ends of the levers being equal to the length of said rod means, and the upper ends of the arms being pivotally connected to the bottom edge of the rear table means, sixth abutment means on said fixed support for limiting rearward pivotal movement of the levers, and seventh abutment means on the arm-rests and the levers for limiting rearward movement of the arm-rests.

5. A seat according to claim 4, wherein the mounting means for the rear table means further comprises, finger means rigid with at least one of said levers, and spring means extending between the finger means and the fixed support means, to counterbalance the weight of the rear table means and the arms.

6. In a multi-place seat, a fixed support means;

transverse shaft means carried by the support means, said transverse shaft means having a pivotal axis A;

a plurality of adjacent back rests each of which has a front and a back and each of which comprises:

a lower portion pivotal individually about said shaft means, and an upper portion pivotably attached to said lower portion and pivotable about a pivotal axis B, said axis B being spaced from said axis A;

a plurality of arm rests including at least one intermediate each adjacent pair of back rests;

means mounting at least the intermediate arm rests for pivotal movement, whereby said arm rests can be raised to a raised position, said mounting means comprising:

upwardly extending rod means associated with each said intermediate arm rest, the lower end of said rod means being pivotally attached to the transverse shaft means and thus being pivotal about axis A, and the upper end of said rod means being pivotally connected to the arm rest, the distance between the pivotal connection of the arm rest to the rod and axis A being the same as the distance between axis A and axis B, whereby the said pivotal connection of the arm rest to the rod is coaxial with the axis B when the arm rest is in its raised position;

a shelf mounted at the back of each said back rest movable between an open and a closed position;

each said shelf being attached to at least one pivotally mounted leg having two ends by means of a mounting arm, said mounted leg at one end being pivotally attached to said mounting arm and the pivotal attachment of the one end to the mounting arm being coaxial with axis B when the shelf is in its closed position;

the other end of each said mounted leg being pivotally attached to the transverse shaft means and thus being pivotal about axis A;

first abutment means rigid with the said fixed support means for limiting forward pivotal movement of the rod means, second abutment means rigid with the arm rest and the rod means for limiting pivotal movement of the arm rest relative to the rod means, and third abutment means rigid with the back rest for limiting rearward unitary movement of the rod means and the arm rest when the arm rest is in a raised position.

7. A seat according to claim 6, comprising at least three said back rests, said seat further comprising front table means, an intermediate one of said back rests having a cavity across its entire width to receive the front table means, the height of said cavity, being equal to the length of said pivotal arm rests, means mounting said front table means for pivotal movement, said mounting means comprising, upwardly extending second rod means, said second rod means being equal in length to said rod means, the lower end of said second rod means being pivotal about an axis coincident with the pivotal axis A of the back rests, and the upper end of said second rod means being pivotally connected to said front table means about an axis coincident with axis B, pivotal movement of said front table means with respect to said second rod means being limited by abutment means.

* * * * *